Nov. 12, 1935.    M. A. BOSTWICK ET AL    2,020,931
NETWORK DISTRIBUTION
Filed May 19, 1934
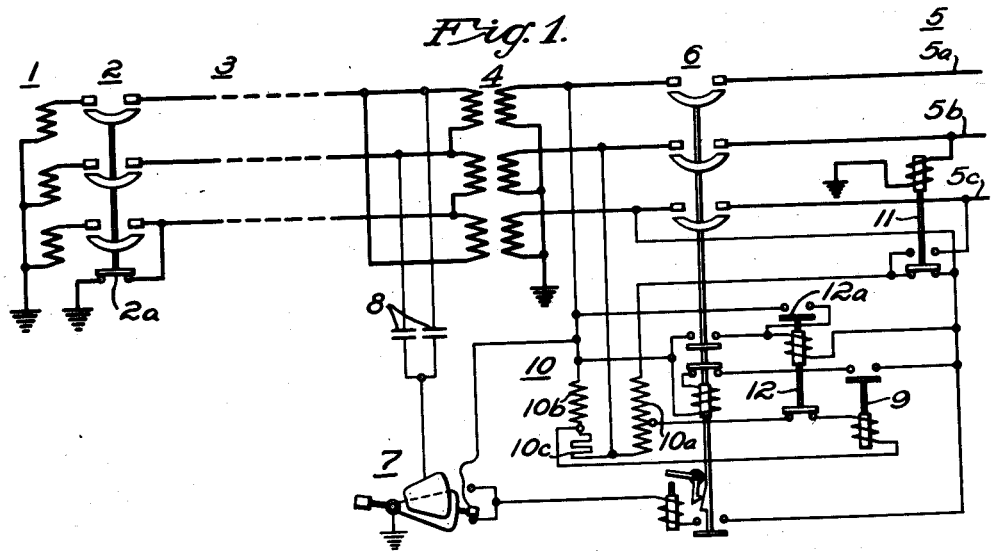
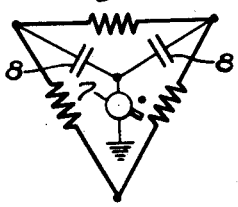
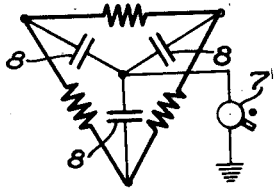
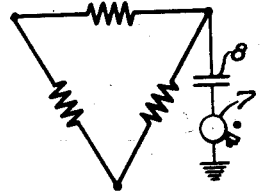
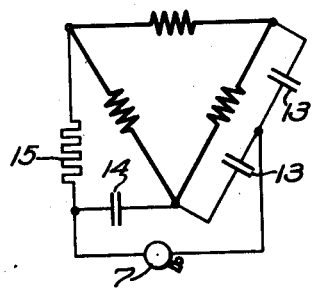
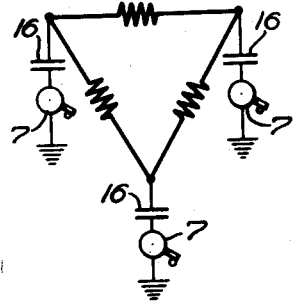
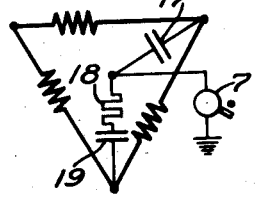
WITNESSES:
INVENTORS
Myron A. Bostwick and
Bernard E. Lenehan.
BY
ATTORNEY

2,020,931

UNITED STATES PATENT OFFICE 2,020,931

NETWORK DISTRIBUTION

Myron A. Bostwick, Spokane, Wash., and Bernard E. Lenehan, Bloomfield, N. J., assignors to Westinghouse Electric & Manufacturing Company, East Pittsburgh, Pa., a corporation of Pennsylvania Application May 19, 1934, Serial No. 726,580

12 Claims. (Cl. 175—294)

Our invention relates to alternating current systems of distribution, and particularly to such systems of the network type. In network systems, a distribution network is supplied by means of a plurality of feeders through step-down transformers from one or more supply sources. The flow of power between the step-down transformers and the network is controlled by means of automatic switches known as network protectors.

It has heretofore been the practice in such systems to provide power directional relay apparatus for causing the network switches to trip open in response to a reverse power flow from the network to the feeder, and to cause the network switch to reclose when the voltage on the feeder side is higher than the voltage on the network side and bears such a phase relationship thereto as to cause power to flow from the feeder to the network immediately after closure of the network switch.

The latter operation of comparing the voltages on the feeder and network sides of the network switch is termed "phasing", and serves the following two purposes: First, closure of the network switch is prevented, if, in repairing a feeder fault, any two conductors of the feeder have been transposed, or all three feeder conductors have been rotated 120° or 240°. Second, the phasing operation serves to prevent repeated opening and closing or "pumping" of the network switch in the event that the relationship of voltages on the feeder and network sides of the switch is such as to cause power flow from the network to the feeder when the switch is closed, and closure of the switch when the latter is open.

However, the second function cannot always be performed perfectly by a single network relay, and at many locations in the network it is necessary to provide the protectors with additional phasing relays to prevent pumping. Even when equipped with such phasing relays, many unnecessary operations of the network protectors occur because of reverse power flow at various points in the network, following the ordinary laws of power distribution through a network.

It is an object of our invention to provide a novel network protector which shall open only when the feeder is faulted, or the feeder breaker is opened to disconnect the feeder entirely at times of light load, and which shall remain closed during normal conditions, regardless of the magnitude or direction of power flow.

Another object of our invention is to provide a simplified network system, in which the power directional apparatus of the prior art shall be eliminated, and a more simple form of electro-responsive device substituted, which shall respond only to feeder ground faults. With such a simplified tripping element, we propose to use a simplified phasing arrangement which will operate to close the network switch when the magnitudes of feeder and network voltages are approximately normal, and no crossed-phase connections exist.

Other objects of our invention will become evident from the following detailed description, taken in conjunction with the accompanying drawing, in which:

Figure 1 is a diagrammatic view of a network system embodying our invention; and, Figs. 2 to 7 are diagrammatic views of alternative forms of fault-responsive device which may be used in the system shown in Fig. 1.

Referring to Fig. 1, a grounded neutral polyphase, medium voltage source 1 is connected by means of a feeder circuit breaker 2 to a feeder 3. Any suitable apparatus, shown diagrammatically as back contacts 2a of the feeder breaker 2, is provided for grounding one conductor of the feeder 3 whenever the feeder breaker is open. The feeder breaker 2 is provided with the usual fault-responsive apparatus, for causing it to open in response to a fault on the feeder 3. As such apparatus forms no part of the present invention and is well-known in the art, it has not been shown in the drawing.

A step-down transformer bank 4 is connected between the feeder 3 and a low-voltage distribution network 5. The transformer bank 4 is preferably connected with its high voltage windings in delta and its low voltage windings in star with neutral grounded, but other arrangements familiar to those skilled in the art may be used. It is necessary, in the practice of our invention, however, that the high-voltage windings of the transformer bank 4 be ungrounded. Although, for simplicity, only one feeder 3 and one transformer bank 4 are shown in Fig. 1, it will be understood that the network 5 is supplied by means of a plurality of feeders, and each feeder is connected to network 5 by means of a plurality of transformer banks in accordance with the usual practice.

A network protector comprising a network circuit breaker 6 and its associated control apparatus, is provided for controlling the flow of power from the transformer bank 4 to the network 5. In accordance with our invention, any suitable apparatus responsive to a ground fault on the feeder 3 is provided for tripping open the network circuit breaker 6. This apparatus is shown as an electrostatic relay 7 connected to the high voltage terminals of one of the transformers 4 by means of a pair of equal impedances, shown as capacitors 8. The relay 7 is preferably provided with front and back contacts, and is so designed, with reference to the capacitors 8, that the front contacts close in response to a ground on any single conductor of the feeder 3. Under such circumstances, of course the voltage to ground of the two ungrounded conductors is approximately 173% of normal. The back contacts of the relay 7 close in response to a double-phase-to-ground fault or a three-phase fault on the feeder 3.

A voltage-responsive relay 9 is provided for controlling the closure of the network circuit breaker 6. The voltage-responsive relay 9 is connected to output terminals of a positive sequence voltage filter 10, to be energized in accordance with the positive symmetrical components of the polyphase voltage applied to the filter 10.

The phase sequence filter 10 is preferably of the type disclosed in the United States patent to B. E. Lenehan, No. 1,936,797, issued November 28, 1933, and assigned to the Westinghouse Electric & Manufacturing Company. This filter comprises an auto-transformer 10a, having a tap to provide a voltage less than half the total voltage impressed on the auto-transformer, for example, a 40% tap, and a reactor 10b and a resistor 10c. The reactor 10b and resistor 10c are proportioned to produce, together, a 40% voltage drop lagging the impressed voltage angle of 60°. Assuming that the phase rotation of the secondary voltages of the transformer bank 4 is as indicated by the subscripts a, b and c of the network conductors 5a, 5b and 5c, the coil of the voltage-responsive relay 9 is subject to a voltage equal to the vector sum of 40% of the A-phase delta voltage applied to the filter 10, and a voltage equal to 40% of the C-phase delta voltage applied to the filter 10 but lagging the latter voltage by a phase angle of 60°. As explained in the above-mentioned Lenehan patent, with such connections, the voltage-responsive relay 9 responds to a positive symmetrical component of the polyphase voltage applied to the filter 10. The relay 9 is preferably designed to close when the positive symmetrical components exceed a predetermined value, of the order of 90% to 95% of the normal phase-to-ground voltage of the network 5.

A transfer relay 11 is provided for transferring the C-phase connection of the filter 10 from the network side to the transformer side of the network circuit breaker 6 when the network 5 is deenergized. With this arrangement the filter 10 is energized in accordance with the polyphase secondary voltage of the transformer bank 4 when the network 5 is deenergized, and in accordance with a polyphase system of voltages derived from both sides of the network circuit breaker 6 when the network 5 is energized. The phase voltages of the network 5 are, of course, referred to ground through neutral connections of other transformer banks (not shown) whenever the network 5 is energized. We do not claim the specific phasing method and apparatus disclosed herein as our joint invention, as such method and apparatus are covered in the copending sole application of M. A. Bostwick, Serial No. 716,819, filed March 22, 1934 and assigned to the Westington Electric & Manufacturing Company.

A lock-out relay 12 is provided for preventing the energization of the voltage-responsive relay 9, after opening of the network circuit breaker 6, until the feeder 3 has been completely denergized by the opening of all other network protectors connected to the feeder. The lock-out relay 12 is designed to remain closed in response to all voltages above a comparatively low value such as 10% of normal, and to close at some higher value such as 60% of normal. As the reactances of the usual network transformers are sufficiently high to prevent the voltages on the network side from falling below something like 50% of normal in response to any faults on the feeder side, the lock-out relay 12 cannot drop out in response to any fault to which the electrostatic relay 7 responds.

The operation of the apparatus shown in Fig. 1 may be set forth as follows: It is assumed that initially the source 1 is energized, and the network 5 is deenergized, and also that the various switches and relays are in the positions shown in Fig. 1. In order to connect the source 1 to the network 5 to supply power thereto, the feeder breaker 2 is closed. Upon closure of the feeder breaker 2, voltage is impressed upon the capacitors 8 and electrostatic relay 7, of sufficient value to cause the movable contact member of the relay 7 to assume its neutral position. The transformer bank 4 is energized from the feeder 3, and a secondary voltage appears across the input terminals of the phase sequence filter 10. Assuming that the connections of the feeder 3 are of proper phase sequence, the positive symmetrical components of the polyphase voltage applied to the filter 10 exceeds 95% of normal value, and the voltage responsive relay 9 closes. The relay 9 in closing, establishes a closing circuit for the network circuit breaker 6, and the latter closes to connect the secondary windings of the transformer bank 4 to the network 5, and also to complete an energizing circuit for the lock-out relay 12.

The lock-out relay 12 closes and establishes a holding circuit for itself, independent of the network circuit breaker 6, through front contact members 12a.

In response to closure of the network circuit breaker 6, the transfer relay 11 is energized and operates to transfer the connection of the C-phase terminal of the filter 10 from the feeder side of the network circuit breaker 6 to the network side thereof.

If a fault occurs on the network 5, the voltage applied to the electrostatic relay 7 is not substantially affected, and the fault is burned off in the usual manner.

If a fault occurs on the feeder 3, the feeder circuit breaker 2 trips open to interrupt the connection of the source 1, and also establishes an artificial ground through its back contact members 2a. In response to the artificial ground established by the feeder breaker 2, the electrostatic relay 7 closes its front contact members to trip open the network circuit breaker 6. In the case of a ground fault, some of the relays 7 may open in response to the ground before the feeder breaker 2 opens. A similar action takes place with all other network protectors supplied from the feeder 3.

When the feeder 3 is completely deenergized by the opening of all network protectors supplied therefrom, the voltage applied to the lock-out relay 12 falls to zero and the lock-out relay 12 drops out to complete the circuit for the voltage responsive relay 9. The voltage responsive relay 9 does not close at this time, however, as there is no voltage available at the terminals of the phase sequence filter 10.

Assuming that the network 5 is energized from other transformer banks (not shown), the transfer relay 11 remains closed, thereby maintaining the connection of the c-phase terminal of the phase sequence filter 10 to the network. However, as the filter 10 is ungrounded, no circuit is completed through the latter, and the voltage-responsive relay 9 remains deenergized.

To re-establish connections from the source 1 to the network 5, the feeder breaker 2 is reclosed. Upon reclosure of the feeder breaker 2, the movable element of the electrostatic relay 7 assumes its neutral position as described above. However, the phase sequence filter 10 is now energized by a polyphase system of voltages consisting of two phases of voltage derived from the secondaries of the transformer bank 4 and one phase of voltage of the network 5. When the positive symmetrical components of this system of voltages exceed the predetermined value, such as 95% of normal, at which the relay 9 is designed to close, the latter recloses to establish the closing connection for the network circuit breaker 6 as described above.

The feeder 2 may be entirely disconnected at times of light load by merely opening the feeder breaker 2. Upon opening the feeder breaker 2, a ground is established through contacts 2a, and the network circuit breaker 6, together with other protectors supplied from the feeder 3, is tripped open.

Referring now to Fig. 2, the electrostatic relay 7 is shown in somewhat more diagrammatic form as energized by means of capacitors 8 in the same manner as in Fig. 1. The back contacts of the relay 7, however, are omitted, and in this arrangement the relay 7 responds only to single phase grounds.

In Fig. 3, three capacitors 8 of equal capacitance value are connected together to form an artificial neutral point, and the electrostatic relay 7 is connected between this neutral point and ground. This arrangement provides for energization of the relay 7 in accordance with the zero phase sequence components of polyphase voltage.

Fig. 4 shows an arrangement in which the electrostatic relay 7 is connected to a single conductor of the feeder, and is provided with front and back contacts to respond to all ground faults. The voltage applied to the relay 7 under any ground fault conditions is either zero or approximately 173% of normal, depending upon the nature of the fault. If the relay 7 is designed to stand in neutral position when the feeder 3 is ungrounded, and to close its front contacts in response to voltage value of approximately 125 to 150% of normal, the relay contacts will close under all ground fault conditions.

Fig. 5 shows a phase sequence arrangement for energizing the electrostatic relay 7 in accordance with a negative phase sequence component of the polyphase feeder voltage. In the arrangement shown in Fig. 5, two equal capacitors 13 are provided for dividing one phase of delta voltage into equal parts. A capacitor 14 and a resistor 15 having a combined leading phase angle of 60° are provided for producing a voltage equal to half of a second delta phase voltage but leading the latter by a phase angle of 60°. The electrostatic relay 7 is connected between the junction points between the capacitors 13 and the elements 14 and 15. During normal conditions, the voltage impressed across the relay 7 is zero, but in the event of a phase-to-phase fault, a negative phase sequence voltage is present and the relay 7 closes its front contacts.

Fig. 6 shows an arrangement in which three electrostatic relays 7, each arranged for under-voltage tripping, are connected directly to the feeder conductors in series with capacitors 16.

Fig. 7 shows an arrangement in which an artificial neutral point is established by means of connections to only two of the feeder conductors. In Fig. 7 a capacitor 17 having an impedance value equal to the combined impedance of a resistor 18 and a second capacitor 19, is connected to the latter two elements, and the electrostatic relay 7 is connected between the junction point thus formed and ground. The resistor 18 and capacitor 19 have a combined leading phase angle of 30°, and, of course, the capacitor 17 has a leading phase angle of 90°. With this arrangement, the voltage applied to the electrostatic relay 8 is zero under normal conditions, but in the event of a ground fault, a zero sequence voltage appears, and the relay 7 operates to close its front contacts.

We do not intend that the present invention shall be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In a network distribution system, a feeder circuit, a network circuit, transformer means for supplying power from said feeder circuit to said network circuit, said transformer means having ungrounded high voltage windings, a network circuit breaker for controlling the flow of power through said transformer means, electrostatic relay means connected to said feeder circuit and responsive only to ground faults thereon for causing said circuit breaker to open, and means responsive to voltage conditions derived from said feeder circuit and said network circuit for causing said circuit breaker to reclose when said feeder circuit is energized and is free of incorrect connections as compared to said network circuit, whereby repeated opening and closing of said circuit breaker is avoided when said feeder circuit is ungrounded, regardless of the direction or magnitude of power flow through said circuit breaker.

2. In a polyphase network distribution system, a polyphase feeder circuit, a polyphase network circuit, transformer means for supplying power from said feeder circuit to said network circuit, said transformer means having ungrounded high-voltage windings, a network circuit breaker for controlling the flow of power through said transformer means, electrostatic relay means connected to said feeder circuit and responsive only to ground faults thereon for causing said circuit breaker to open, and means responsive to voltage conditions derived from said feeder circuit and said network circuit for causing said circuit breaker to reclose when said feeder circuit is energized and is free of incorrect phase connections as compared to said network circuit, whereby repeated opening and closing of said circuit breaker is avoided when said feeder is ungrounded, regardless of the direction or magnitude of power flow through said circuit breaker.

3. In a polyphase network distribution system, a polyphase feeder circuit, a polyphase network circuit, transformer means for supplying power from said feeder circuit to said network circuit, said transformer means having ungrounded high-voltage windings, a network circuit breaker for controlling the flow of power through said transformer means, voltage-responsive electrostatic relay means connected to said feeder circuit and responsive only to ground faults thereon for causing said circuit breaker to open, and means responsive to voltage conditions derived from said feeder circuit and said network circuit for causing said circuit breaker to reclose when said feeder circuit is energized and is free of incorrect phase connections as compared to said network circuit, whereby repeated opening and closing of said circuit breaker is avoided when said feeder circuit is ungrounded, regardless of the direction or magnitude of power flow through said circuit breaker.

4. In combination with transformer means for supplying power from an ungrounded feeder circuit to a network circuit, a network circuit breaker for controlling the flow of power through said transformer means, fault-responsive means including an electrostatic relay energized from said feeder circuit and responsive only to ground faults thereon for causing said circuit breaker to open, and automatic reclosing means for said circuit breaker.

5. In combination with polyphase transformer means for supplying power from an ungrounded polphase feeder circuit to a polyphase network circuit, a network circuit breaker for controlling the flow of power through said transformer means, fault-responsive means including an electrostatic relay energized from said feeder circuit and responsive only to ground faults thereon for causing said circuit breaker to open, and means responsive to the positive symmetrical components of a polyphase system of voltages derived in part from both of said circuits, for causing said circuit breaker to close in response to a substantially normal relationship of voltages of said circuits.

6. In a network distribution system, a grounded-neutral source, a feeder circuit connected to said source, a feeder circuit breaker for controlling the flow of power through said feeder circuit, a network circuit, transformer means for supplying power from said feeder circuit to said network circuit, said transformer means having ungrounded high voltage windings, electrostatic relay means connected to said feeder circuit and responsive only to a grounded condition thereof for causing said network circuit breaker to open, means responsive to a fault on said feeder circuit for causing said feeder circuit breaker to open, and means effective when said feeder circuit breaker is open for establishing said grounded condition of said feeder circuit, whereby said network circuit breaker opens only in response to a fault on said feeder circuit or the opening to a fault on said feeder circuit or the opening of said feeder breaker, regardless of the direction or magnitude of power flow therethrough.

7. In a network distribution system, a grounded-neutral source, a feeder circuit connected to said source, a feeder circuit breaker for controlling the flow of power through said feeder circuit, a network circuit, transformer means for supplying power from said feeder circuit to said network circuit, said transformer means having ungrounded high-voltage windings, phase-to-ground voltage responsive means connected to said feeder circuit and responsive to a grounded condition thereof for causing said network circuit breaker to open, reclosing means for said network circuit breaker, lock-out means for preventing reclosure of said network circuit breaker after opening thereof until said feeder circuit is completely deenergized, means responsive to a fault on said feeder circuit for causing said feeder circuit breaker to open, and means effective when said feeder circuit breaker is open for establishing said grounded condition of said feeder circuit, whereby said network circuit breaker opens only in response to a fault on said feeder circuit or the opening of said feeder breaker, and repeated opening and closing of said network circuit breaker is prevented during normal conditions and during fault conditions until said feeder circuit is completely deenergized.

8. In combination with a three-phase ungrounded circuit and means for energizing said circuit with three-phase voltage, electroresponsive means for detecting ground faults on said circuit comprising voltage-responsive means energized in accordance with the voltage between a single conductor of said circuit and ground, said voltage-responsive means including elements operable in response to both undervoltage conditions and overvoltage conditions.

9. The combination as defined in claim 8, in which the voltage-responsive means is an electrostatic relay having contacts operable in response to both undervoltage conditions and overvoltage conditions.

10. In combination with a three-phase ungrounded circuit and means for energizing said circuit with three-phase voltage, electroresponsive means for detecting ground faults on said circuit comprising a pair of impedance means each having a terminal connected to different conductors of said circuit and having their free terminals connected together to form a junction point, and an electrostatic relay responsive to the voltage between said junction point and ground.

11. The combination as defined in claim 10, in which the pair of impedance means is a pair of capacitors.

12. The combination as defined in claim 10, in which the pair of impedance means have absolute impedance values and impedance phase angles so related as to segregate a resultant voltage condition dependent upon a plurality of phases of the voltage of the circuit.

MYRON A. BOSTWICK.
BERNARD E. LENEHAN.